May 11, 1943. R. REYNOLDS 2,318,969
WATER DISTRIBUTION APPARATUS
Filed Oct. 25, 1938 6 Sheets-Sheet 6

Fig.13.

Inventor
Richard Reynolds
By Wm E Hodges
Attorney

Patented May 11, 1943

2,318,969

UNITED STATES PATENT OFFICE 2,318,969

WATER DISTRIBUTION APPARATUS

Richard Reynolds, Washington, D. C.

Application October 25, 1938, Serial No. 236,961

6 Claims. (Cl. 161—7)

This invention is a water distribution apparatus designed primarily for sprinkling lawns of large areas, although not limited to this particular use.

One of the objects of the invention is to provide a water-distribution apparatus for automatically turning water on and off at predetermined intervals of time. A further object is to provide an apparatus so designed that the water may be alternately turned on and off at predetermined intervals during any period of the day or night in such manner as to intermittently permit the flow of water at predeterminedly selected intervals of time, such as every hour, or of shorter periods such as five, ten, fifteen, or thirty minutes. A further object is to provide for automatically starting and stopping the foregoing operations and for selecting the limits of duration of such operations. A further object is to provide for automatically breaking the control circuits in the event of rain, whereby the functioning of the apparatus will be interrupted.

The invention will be hereinafter fully set forth and particularly pointed out in the claims.

In the accompanying drawings:

Figures 8 and 9 being diagrammatic views illustrating the time-control circuits.

Figures 3, 4, 5, 6:
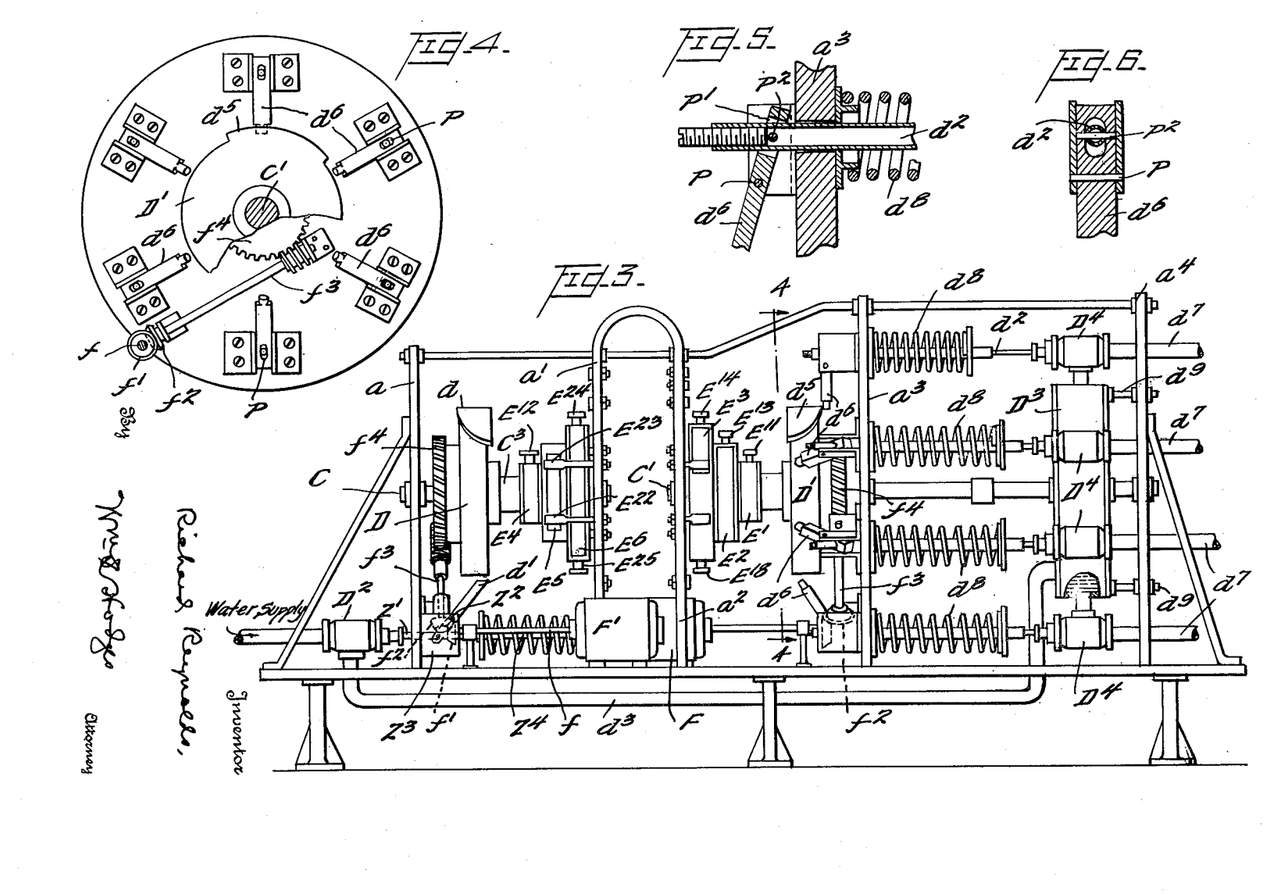
Figure 3 is a side elevation illustrating the valve-control mechanism.
Figure 4 is a vertical sectional view on the line 4—4, Figure 3.
Figures 5 and 6 are detail sectional views illustrating one of the valve operating members.

Referring to Figure 3 of the drawings, A designates a frame which is provided with a plurality of upright members $a$, $a'$, $a^2$, $a^3$ and $a^4$, which serve to support two fixedly mounted shafts C and C', respectively in axial alignment. Sleeves $C^3$ and $C^4$ are rotatively mounted on said respective shafts, and are respectively provided with cams D and D' mounted to rotate therewith. Rotation is imparted to sleeve $C^3$ by means of a motor F', the shaft $f$ of which carries a beveled gear $f'$ meshing with a complemental gear $f^2$ connected with a worm shaft $f^3$. The latter drives a worm gear $f^4$ mounted on and rotatable with said sleeve $C^3$. Rotative movement is imparted to sleeve $C^4$ by a second motor F, through the medium of similar beveled and worm gearing, arranged in exact duplication of the parts described in connection with motor F', but in reversed relation.

The cam D is provided with a single cam surface $d$ positioned to engage an arm $d'$, pivotally mounted in the housing $Z^3$ for gears $f'$ and $f^2$, and connected to the stem $Z'$ of a supply valve $D^2$ which controls the water supply to a distribution chamber $D^3$ through pipe $d^3$. Said chamber is supported in frame A by the rod $a^5$ and bolts $d^9$. The valve $D^2$ is normally held in closed position by a spring Z positioned to react against an abutment $Z^4$. During rotation of the cam D, the cam surface $d$ will engage the arm $d'$ in such manner as to unseat valve $D^2$ against the tension of its spring Z, and will retain it in that position until the cam is moved to release said arm.

Cam D' is provided with a cam surface $d^5$, so positioned as to successively engage a plurality of actuator arms $d^6$, one for each of a plurality of valves $D^4$, separately controlling flow of water from chamber $D^3$ through a corresponding number of discharge pipes $d^7$. The valves $D^4$ are normally seated by means of springs $d^8$, and there is one unseating arm $d^6$ for each valve $D^4$. The arms $d'$ and $d^6$ are identical in structure, arrangement, and operation, and are illustrated in detail in Figures 4, 5 and 6. As shown, each arm is pivoted at P to a part $a^3$ of the frame A, and is provided with a slotted opening P' through which a valve stem—such as valve stem $d^2$ for instance—is extended. The valve stem and the arm are pivotally connected at $P^2$. By means of this arrangement, the valve spring will always tend to maintain the arm in position to be engaged by its operating cam. The valve stem is guided by means of a sleeve $P^3$, and its outward movement is limited by a stop $P^4$. The stem of each of the valves $D^4$ is connected with a spring $d^8$, and each arm $d^6$ is mounted and operated in identically the same manner as illustrated in Figures 5 and 6, and already described with respect to the arm $d'$.

The circuits to the motors F and F' are automatically controlled by a system of relays in association with contacts carried by the sleeves $C^3$ and $C^4$. For instance, the sleeve $C^4$ is provided with a contact $E'$ in the form of a concentric ring, and with two other concentric contacts $E^2$ and $E^3$, see Figure 7. In a similar manner the sleeve $C^3$ is provided with a ring-like contact $E^4$ and two concentric segmental contacts $E^5$ and $E^6$. Contacts $E'$ and $E^2$ are connected by a wire $E^9$, contacts $E'$ and $E^3$ are connected by a wire $E^8$, and contacts $E^4$ and $E^6$ are connected by a wire $E^{10}$. The contact ring $E'$ is at all times engaged by a fixed contact $E^{11}$ and a similar contact $E^{13}$ is positioned to engage segment $E^2$. A plurality of circumferentially spaced fixed contacts $E^{14}$, $E^{15}$, $E^{16}$, $E^{17}$, $E^{18}$ and $E^{19}$ are positioned to engage the segment $E^3$. A fixed contact $E^{12}$ is in constant engagement with contact ring $E^4$, a plurality of circumferentially spaced fixed contacts $E^{20}$, $E^{21}$, $E^{22}$ and $E^{23}$ are positioned to engage segment $E^5$, and a plurality of fixed circumferentially spaced contacts $E^{24}$ and $E^{25}$ are arranged to engage the segment $E^6$. Contacts $E^{13}$ and $E^{23}$ are connected by a wire 126 and contacts $E^{11}$ and $E^{12}$ are connected by a wire 127. A wire 124 is provided with branches connecting contact $E^{21}$ with contacts $E^{17}$, $E^{18}$ and $E^{19}$.

Figure 7:
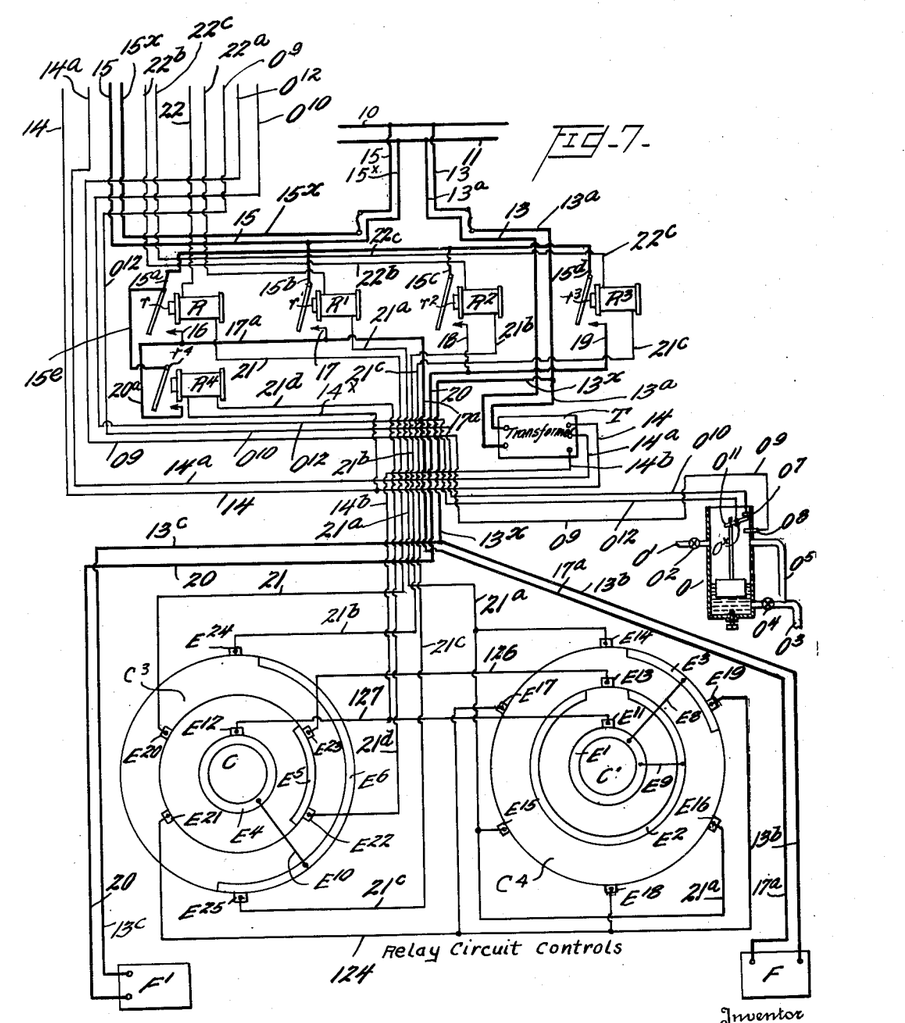
Figures 7, 8 and 9 are diagrammatic views of the wiring of the control system, which views must be considered with relation to each other, Figure 7 being a diagrammatic view illustrating the motor-operating circuits and the relay circuits controlling the latter.

The circuit to the motor F is automatically controlled by relays R, R', and the circuit to motor F" is controlled by relays $R^2$ and $R^3$. Referring more particularly to Figure 7 of the drawings, 10, 11 designate typical line wires of the usual 110 volt street current. Connected with wire 10 are two wires 13 and 15, respectively, and connected with wire 11 are two wires $13^a$ and $15^x$ respectively. The wires 13 and $13^a$ provide the primary circuit for a transformer T of any suitable structure, wound to reduce the 110 volt current to two selective lower voltage secondary circuits, one for approximately 14 volts and including the wires 14 and $14^b$, and the other for 6 volts and including wires $14^a$ and $14^b$. In the wiring diagrams the 110 volt circuits are indicated by heavy lines, the 6 volt and 14 volt circuits are indicated by light lines. The wire 15 is connected by a wire $15^o$ with a wire $15^z$, which in turn is provided with a plurality of branch wires $15^a$, $15^b$, $15^c$, $15^d$ and $15^e$, respectively connected with the movable contacts $r$, $r'$, $r^2$, $r^3$ and $r^4$ of the relays R, R', $R^2$, $R^3$ and $R^4$. The fixed contacts 16 and 17 of relays R' and $R^2$ are connected with a wire $17^a$, which in turn is connected to one terminal of the motor F. The other terminal of the said motor is connected by wires $13^b$ and $13^x$ with the wire $13^a$. The fixed contact $r^4$ of relay $R^4$ is connected by wire $20^a$ with the wire $17^a$. The fixed contacts $r^2$ and $r^3$ of relays $R^2$ and $R^3$ are connected with one terminal of motor F' by means of wire 20, a wire $13^c$ leading from the other contact of said motor to the above mentioned wire $13^x$.

Connected with one terminal of the coil of relay R is a wire 22, the other terminal thereof being connected with contact $E^{20}$ by means of wire 21. Connected with one terminal of the coil of relay R' is a wire $22^a$ and the other terminal of said coil is connected with contacts $E^{14}$, $E^{15}$ and $E^{16}$ by a wire $21^a$ having branches leading to the last mentioned contacts. Connected with one terminal of the coil of relay $R^2$ is a wire $22^b$ and the other terminal of said coil is connected with contact $E^{24}$ by wire $21^b$. Connected with one end of the coil of relay $R^3$ is a wire $22^c$ and the other end thereof is connected with contact $E^{25}$ by a wire $21^c$. One end of the coil of relay $R^4$ is connected with wire 14 by means of a wire $14^x$ and the other end thereof is connected with contact $E^{22}$ by wire $21^d$. From the foregoing it will be readily understood that relays R and R' control the circuit of motor F and that relays $R^2$ and $R^3$ control the circuit of motor F". The functions of the relay $R^4$ will be later described.

Figures 1, 2, 11, 12:
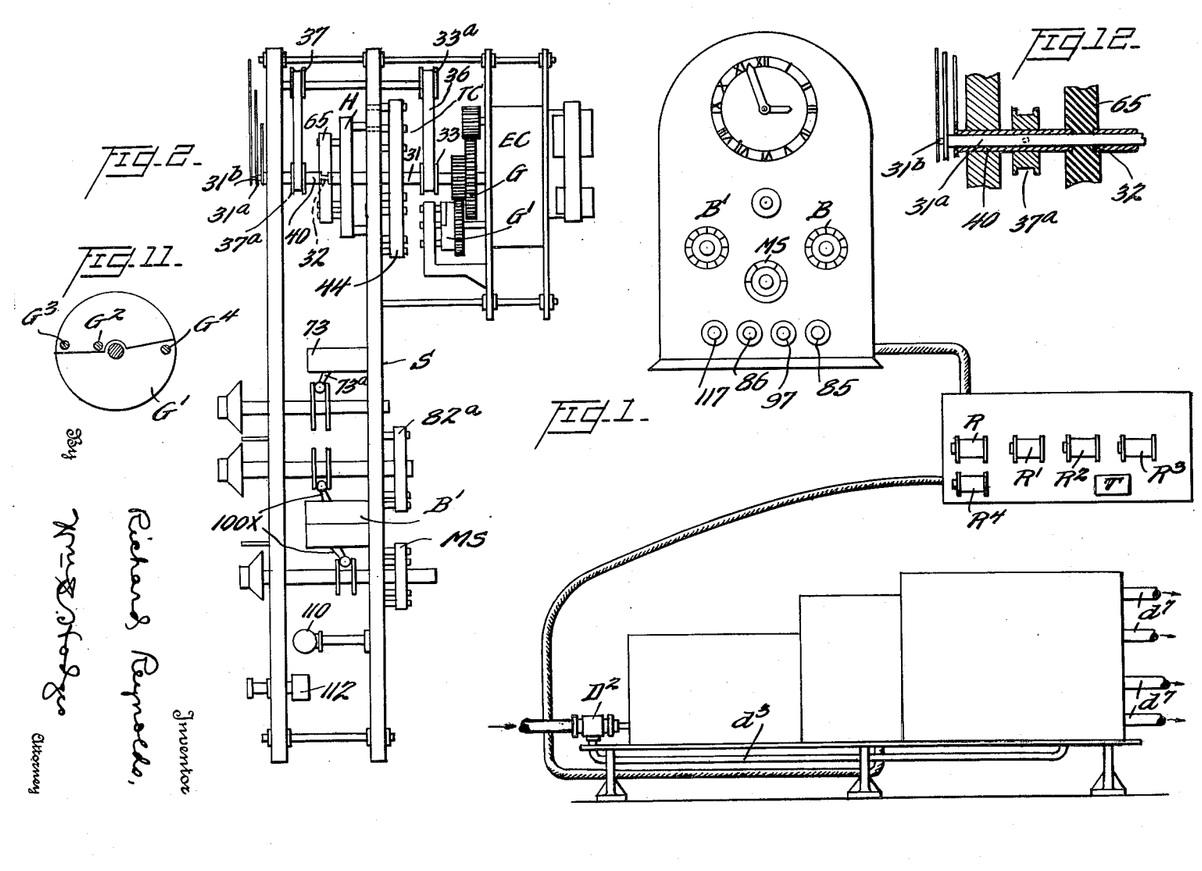
Figure 1 is a front elevation illustrating the apparatus in a more or less diagrammatic manner.
Figure 2 is a side elevation of the control board.
Figure 11 is a detail view of the time-changing disk for selectively limiting opperation of the apparatus to predetermined a. m. and p. m. periods, respectively.
Figure 12 is a detail sectional view illustrating the mounting of the hour and minute shafts of the clock mechanism.
Figures 8, 10:
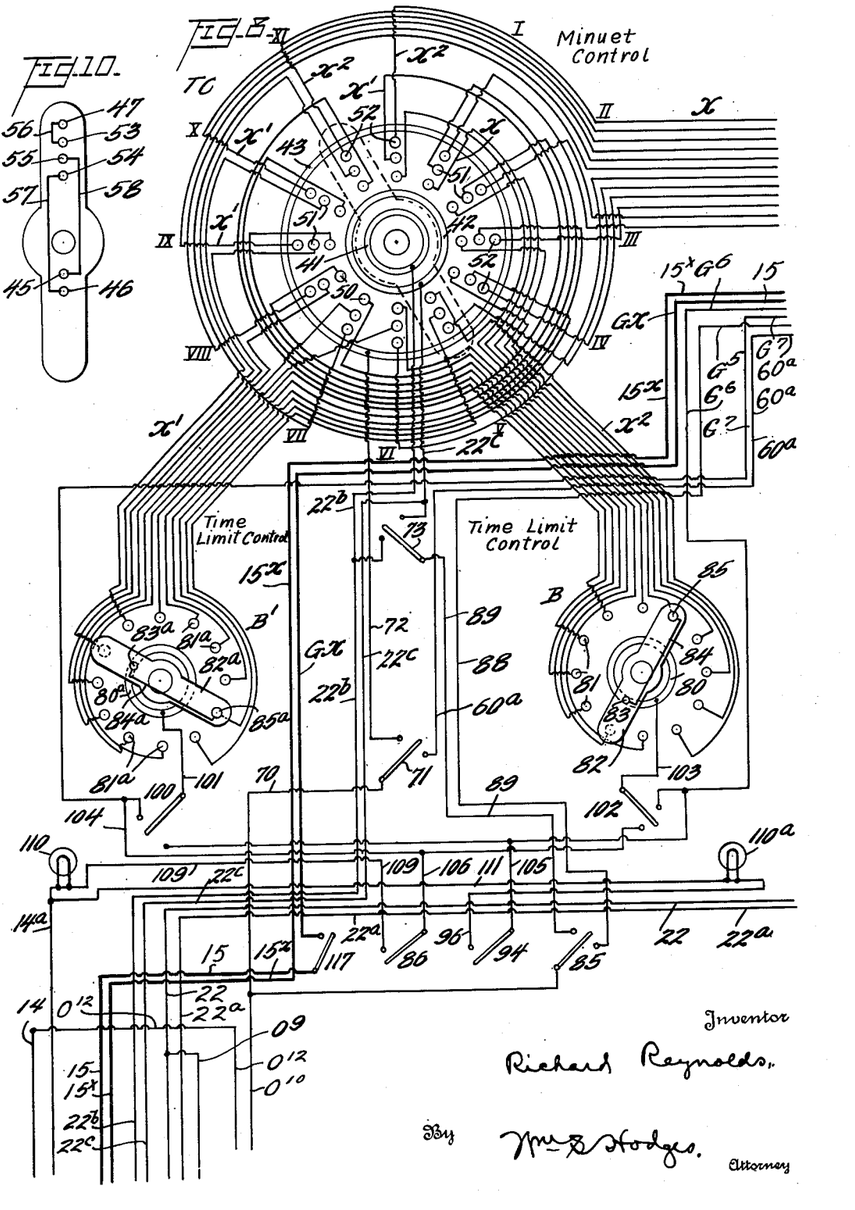
Figure 10 is a detail plan view of the movable contact arm for the minute control circuits of Figure 8.
Figure 9:
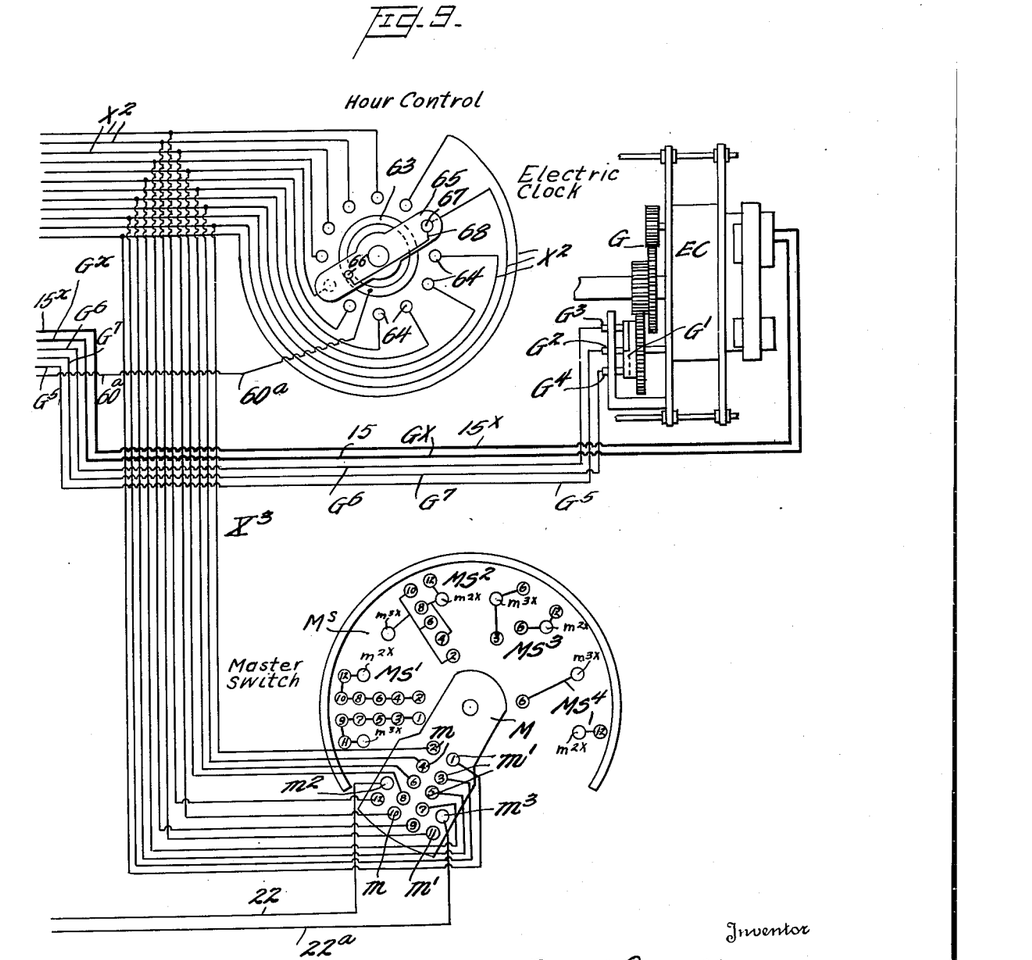

A system for automatically controlling the operation of the relays is illustrated in Figures 7, 8 and 9. Referring more particularly to the last mentioned figures in conjunction with Figures 2, 11 and 12, an electrical clock EC of any preferred construction is mounted upon a panel board S. Said clock is provided with the usual train of gears operating the hour, minute and second shafts carrying suitable indicating hands. The clock motor circuit includes trunk wire 10, wire 15, the clock motor CM, wire $15^x$ and trunk wire 11. The hour shaft 31 is broken as indicated at 32, the minute and second shafts $31^a$ and $31^b$ respectively, being extended therethrough in the usual manner. Mounted upon the rear section of the hour shaft 31 is a pulley 33, which is connected by a belt 34 with a complemental pulley $33^a$ on counter shaft 36. The latter is provided with a second pulley 37 connected by a belt 38 with a pulley $37^a$, carried by an extension 40 of the hour shaft 31.

Supported by panel board S is a circuit controlling device TC for energizing motor F at intervals of less than one hour, the same comprising a base provided with three concentric contact rings 41, 42, 43, respectively. Wire $22^b$ is connected with ring 41 and wire $22^c$ is connected with ring 42. Within the area established by the largest ring 43 are a plurality of series of concentrically disposed fixed contacts 50, 51 and 52 respectively, there being twelve contacts in each series, so arranged that they are disposed in radial sets, each set containing one each of contacts 50, 51 and 52, the radial sets being located at positions corresponding to those of the numbers on a clock face, see Figure 8.

Secured to and rotatable with the minute shaft 32 of the clock is a distributor bar 44 of sufficient length to extend radially across the face of the control device TC to a position beyond ring 43. Said bar 44 is provided with a contact 45 which is at all times in engagement with the ring 41, a second contact 46 at all times in engagement with ring 42, and a third contact 47 at all times in engagement with ring 43. The bar 44 is also provided with contacts 53, 55 and 54, so positioned as to simultaneously engage successive sets of contacts 52, 50 and 51, respectively, during rotative clockwise travel of said bar. Contact 53 is connected with contact 47 by a wire 56, contacts 54 and 46 are connected by a wire 57, and contacts 55 and 45 are connected by a wire 58. H designates an "hour" control switch, consisting of a base provided with a central contact ring 63 arranged concentrically with respect to the axis of the hour shaft, and with a plurality of contacts 64 surrounding said ring and occupying positions corresponding to the number-positions on a clock face. Ring 63 is connected by a wire $60^a$ with one fixed contact of a switch 71, the movable member of the latter being connected with a wire 70. The other fixed contact of said switch 71 is connected with ring 43 of the control TC by a wire 72. Secured to and rotatable with the hour shaft 32 is a distributor bar 65, which has a contact 66 in constant engagement with the ring 63, and also carries a contact 67 positioned to successively engage the contacts 64 during clockwise travel of the said bar. Contacts 66 and 67 are connected by a wire 68. Each contact 64 of the minute control H is connected with a correspondingly clock-face-positioned contact 52 of the hour control TC by means of a wire $X^2$, there being twelve of such wires.

The conductors $X^2$ are also connected by branch wires $X^3$ with a corresponding number of juxtapositioned sets of contacts carried by a movable arm M of a master switch MS. There are two sets of said contacts $m$, $m'$, and six in a set, the contacts $m$ being connected to those wires $X^3$ which are in circuit with contacts 52 at the clock-face positions numbered from 2 to 12, both inclusive, and the contacts $m'$ being connected with those wires $X^2$ which are in circuit with contacts 52 at odd hour the clock-face positions, as indicated by the numbers. Associated with the series of contacts $m$ but isolated therefrom is a contact $m^2$ connected with wire 22, and associated with the group of contacts $m'$ but isolated therefrom is a contact $m^3$ connected with wire $22^a$.

The switch arm M is centrally pivoted with respect to a ring M' and disposed within said ring are four groups of contacts MS', $MS^2$, $MS^3$ and $MS^4$, respectively, all arranged to be selectively covered by the contacts of arm M in a manner to bring the latter into register with contacts of each selected group. The group MS' contains exactly the same number of contacts as are shown on the arm M and predeterminedly positioned with respect to the contacts $m$ and $m'$ and their relation to clock-face-number positions, as well as contacts $m^{2x}$ and $m^{3x}$, complemental to contacts $m^2$ and $m^3$. The contacts numbered 1, 3, 5, 7, 9, 11 and $m^{3x}$ of group MS' are connected in series by suitable conductors, and the contacts $m$ numbered 2, 4, 6, 8, 10 and 12 of group MS' are similarly connected in series with the contact $m^{2x}$. When the arm M has been adjusted to engage the contacts of group MS', all of the contacts $m$ and $m'$ will be in register with correspondingly numbered contacts of said group MS'. Also the contact $m^{2x}$ of said last mentioned group will be engaged with contact $m^2$ of the switch arm, and the contact $m^{3x}$ will be engaged with the contact $m^3$ of the switch arm. This arrangement assures operation of the apparatus at 5 minute intervals.

The group of contacts $MS^2$ is intended to operate the device at 10 minute intervals, but it will be observed that said group is limited to a duplication of the even-hour-positioned contacts of group MS', i. e. those complemental to contacts $m$ and contacts $m^{2x}$, plus contact $m^{3x}$. The contacts of group $MS^2$ which correspond to clock-face numbers 4, 8 and 12 are connected in multiple with the contact $m^{2x}$, and the contacts corresponding to clock-face numbers 2, 6 and 10 are connected in multiple with the contact $m^{3x}$.

The third group of contacts $MS^3$ is intended to control the apparatus at 15 minute intervals. This group consists of four contacts respectively corresponding to clock-face numbers 3, 6, 9, 12, and to contacts $m^{2x}$ and $m^{3x}$. The contacts 6 and 12 are connected in multiple with contact $m^{2x}$ and the contacts 3 and 9 are connected in multiple with the contact $m^{3x}$.

The set of contacts $MS^4$ is designed for half hourly operation and involves only four contacts, namely those corresponding to the 6 and 12 o'clock positions of the clock face, and contacts $m^{2x}$ and $m^{3x}$. Contact for six o'clock position is in circuit with contact $m^{3x}$ and the contact for 12 o'clock position is in circuit with the contact $m^{2x}$.

When the apparatus is initially installed the sleeve $C^3$ must be placed in the full-line position of Figure 7 and with the cam surface $d$ in the full-line position of Figure 3. At this time valve $D^2$ will be closed. To manually start operation of the apparatus, switch 85 is adjusted to connect wires 84 and 89, and switch 73 is adjusted to connect wires 89 and $22^c$. These adjustments will establish a relay circuit including transformer T, wires 14 and $O^{12}$, contact $O^{11}$ and $O^7$, wires $O^{10}$ and 84, switch 85, wire 89, switch 73, wire $22^c$, relay $R^3$, wire $21^c$, contact $E^6$, wire $E^{10}$, contact $E^4$, wire 127, and wire $14^b$ to the transformer (see Figure 13). Energization of relay $R^3$ closes the circuit to the motor F' so as to effect rotation of the sleeve $C^3$ until the contact $E^6$ moves out of engagement with the brush $E^{25}$, at which time the motor circuit is broken, and the contact $E^6$ is engaged with the brush $E^{24}$. At the same time contact $E^5$ will have been disengaged from the brushes $E^{22}$ and $E^{23}$ and moved into engagement with brushes $E^{20}$ and $E^{21}$. In order to arbitrarily close the valve $D^2$ and thereby arrest the flow of water to the drum $D^3$, the switch 73 will be adjusted to close the circuit through wire $22^b$ to relay $R^2$. The circuit thus established includes the transformer T, wires 14 and $O^{12}$, movable contact $O^{11}$ and $O^7$, wires $O^{10}$ and 84, switch 85, wire 89, switch 73, wire $22^b$, relay $R^2$, wire $21^b$, contact $E^{24}$, contact $E^6$, wire $E^{10}$, contact $E^4$, wire 127 and wire $14^b$ to transformer T. This will effect the energization of the motor F' and cause the carrier $C^3$ to rotate 180° or until the contact $E^6$ moves to the full-line position, out of engagement with the brush $E^{24}$. If the rain control O is not employed, the wire 14 will be directly connected to wire 84 and except for this the circuits established are the same as above described. Of course, if the rain control has automatically operated to break the circuit between contacts $O^7$ and $O^{11}$, the relay circuits will be correspondingly broken.

It is also essential that the contact $E^2$ be initially in the full line position of Figure 7, and if operation of the apparatus is interrupted for any reason, and the said contact is not in its said full line position, a circuit will be automatically closed through the relay $R^4$ to energize the motor F and effect rotation of the carrier $C^4$ until the contacts $E^2$ and $E^3$ are brought to their full line positions. Said circuit includes wires 14 and $14^x$, relay coil $R^4$, wire $21^d$, contact $E^5$, wire 126, contact $E^2$, wire $E^9$, contact E', wire 127 and wire $14^b$ to the transformer T. This will close an energizing circuit for the motor F', which circuit has already been fully described and will effect rotation of the carrier $C^4$ until the contacts $E^2$ and $E^3$ are brought to the full line positions. The last mentioned circuit will also be automatically established by the above mentioned adjustment of contact $E^5$ to close valve $D^2$, because the contact $E^5$ will thereby be brought to the full-line position of Figure 7.

During these operations the switches 100 and 102 must be in neutral positions. Automatic starting and stopping of the control apparatus is effected by the switches B and B' operating in conjunction with a clock-operated switch, as shown in Figure 8. The switches B and B' respectively comprise contact rings 80, 80ª, each surrounded by twelve concentrically arranged contact points 81, 81ª, respectively. Mounted upon centrally disposed pivots are manually adjustable contact bars 82, 82ª, provided with contacts 83, 83ª, respectively, so positioned as to at all times engage the respective rings 80, 80ª. Contacts 83, 83ª are connected by wires 84, 84ª with contacts 85, 85ª, respectively positioned to engage the contacts 81, 81ª. The contact points 81 are connected by wires X with correspondingly clock-face-positioned contacts 50 of the minute control TC, and contacts 81ª are connected by wires X' with contacts 51 of the said minute control in a similar manner. The ring 80 is connected by wire 103 with the movable contact of a two-way switch 102 and the ring 80ª is connected by wire 101 to the movable contact of a two-way switch 100. The cars 82 and 82ª are normally adjusted to open-circuit positions.

The clock EC is provided with a time control switch comprising a contact plate G', and three fixed contacts $G^2$, $G^3$ and $G^4$ respectively. The plate G' is rotatively driven by the clock gearing and is of such size that while in full line position Figure 9, it will maintain engagement with the contacts $G^2$ and $G^3$ for the first twelve hours of a day and while in dotted line position, to maintain engagement with the contacts $G^2$ and $G^4$ for the second twelve hours of the day. Contact $G^2$ is connected by a wire $G^5$ with one fixed terminal of two-way switch 85. The contact $G^3$ is connected by a wire $G^6$ with one fixed contact of two-way switch 102. Contact $G^4$ is connected by a wire $G^7$ with a fixed contact of two-way switch 100. Said wire $G^6$ is connected by a branch wire 95 with the other fixed contact of the switch 100, so as to by-pass switch 102. The wire $G^7$ is connected by a wire 104 to the other fixed contact of the switch 102, so as to by-pass switch 100.

It is preferred to provide means for automatically cutting off the water supply in case of rain, although this means may be omitted without departing from the spirit of the invention. Such a device as illustrated in Figure 7 comprises a float chamber O, having a supply pipe O', for delivering drainage water during a rain storm into said chamber. Said supply pipe may be provided with a manual shut off valve $O^2$. The chamber O is provided with an outlet pipe $O^3$ controlled by a manual valve $O^4$, an overflow pipe $O^5$ being arranged to by-pass said valve $O^4$. Located in a position above the normal high water level within chamber O is a control switch having two fixed contacts $O^7$ and $O^8$, and a movable contact $O^{11}$ is so mounted at $O^x$ as to be moved by an arm connected with a float $O^{13}$ within said chamber O. Downward movement of the float may be limited by an adjustable stop $O^{14}$. Contact $O^7$ is connected by wire $O^{10}$ with wires 70 and 84. Wire 70 terminates at the movable member 71ª of the two-way switch 71ª, the wire 84 leading to the movable member of the two-way switch 85. The contact $O^8$ is connected with the wire 22ᵇ by wire $O^9$. The contact $O^{11}$ is connected to wire 14 by wire $O^{12}$.

Transformer wire 14ª is connected with one terminal of a lamp 110, the other terminal of this lamp being connected by wire 109 with one contact of a switch 86, the other contact of said switch being connected with wire 104 by wire 106. Wire 14ª is also connected by a wire 111 with one contact of lamp 110ª, the other contact of said lamp being connected to a contact of switch 94 by a wire 96. The other contact of switch 94 is connected by wire 105 with wire 95.

In practice, the operations of the motor F are automatically controlled by relays R and R', and the operations of the motor F' are automatically controlled by the relays $R^2$ and $R^3$. The circuits through relays R and R' are controlled by the contacts $E^3$ and $E^5$ of the control apparatus A, and the circuits through the relays $R^2$ and $R^3$ are controlled by the contact $E^6$. The contact $E^3$ is definitely positioned with respect to the cam $d^5$ which operates the valves $D^4$, i. e. it occupies the same radical position with respect to the axis of sleeve $C^4$ as is occupied by said cam.

Figure 13:
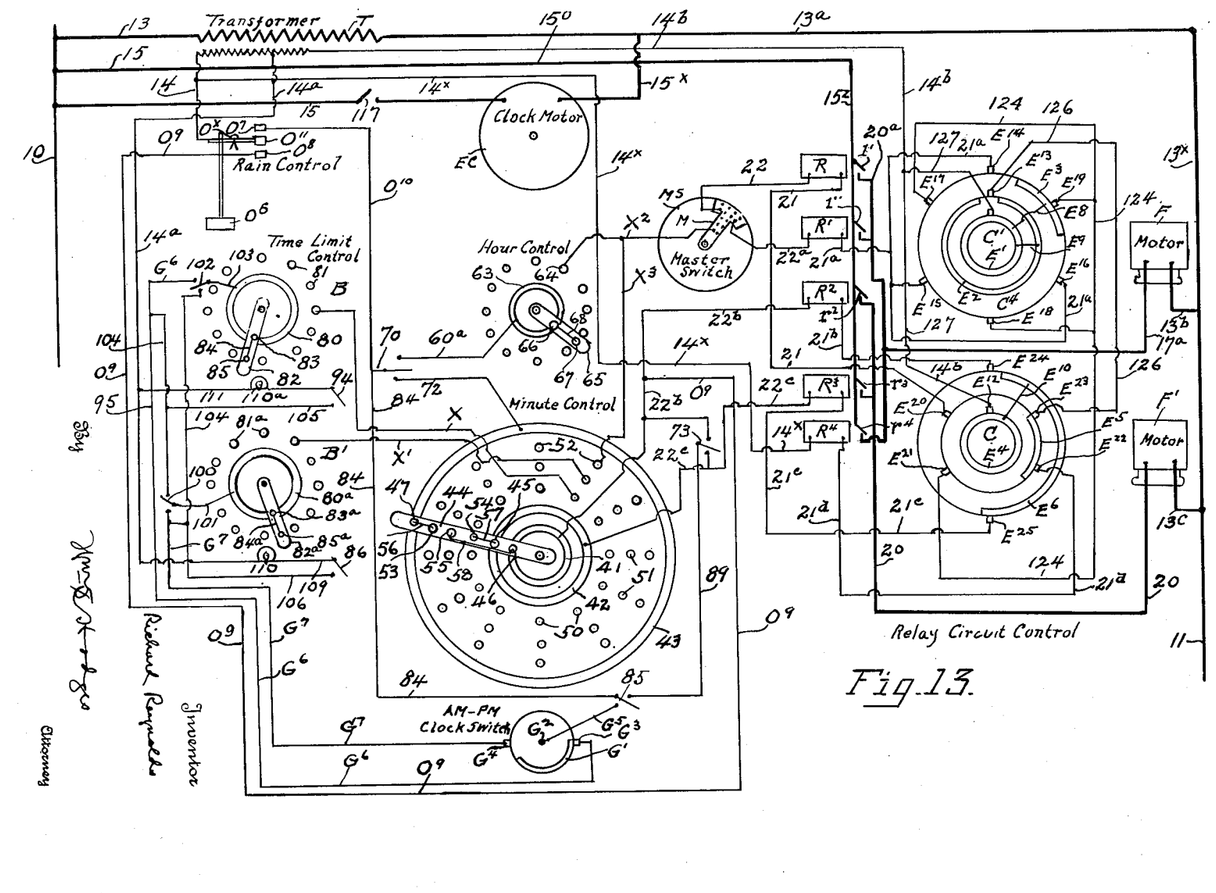
Figure 13 is an explanatory diagram of the wiring of Figures 7, 8 and 9, parts being omitted for the purpose of simplification in tracing the circuits.

The circuits to the various relays are controlled selectively by the minute control TC, the hour control H, the master switch MS, and the switches B and B', determined by the respective selective settings thereof, and typical circuits are shown in Figure 13.

When it is desired to operate the water controlling valves $D^4$ at intervals of less than one hour, the arm M is manually adjusted to engage a selected group of contacts of the switch MS, depending upon whether 5 minute, 10 minute, 15 minute, or 30 minute intervals is desired. Assuming that a 5 minute interval is desired, the switch arm M will be adjusted to engage the contacts of group MS' and the switch 71 will be adjusted to place wires 70 and 72 in circuit. The intervals of the operations will be controlled by the clockwise movement of the contact arm 44 around the face of the minute control TC. Each circuit thereby established will include transformer T, wires 14 and $O^{12}$, contacts $O^{11}$ and $O^7$, wire $O^{10}$ and wire 70, switch 71, wire 72 to contact ring 43, contact 47, wire 56, contact 53, a selected contact 52, the wire $X^2$ connecting said contact 52 with a complemental contact of switch arm M. If said complemental contact is one of group m the circuit will be completed so as to include contacts $m^{2x}$ and $m^2$, wire 22, relay R, wire 21, contact $E^{20}$, contact $E^5$, wire 124, contact $E^3$ (which at that time will be in one of its circuit closing positions with wire 124) wire $E^8$, contact E', wires 127, 14ᵇ and transformer T. If the above mentioned "complemental" contact of switch arm M is one of the m' group the circuit will be completed so as to include contacts $m^{3x}$ and $m^3$, wire 22ª, relay R', wire 21ª to contact $E^3$ and then to transformer T through the same course as described for contacts of group m. By means of this arrangement the motor F will be intermittently operated each time contact 53 engages a contact 52, and the contact $E^3$ will be moved to a new position. Similar intermittent operations of the motor F but at selective longer intervals of time will be effected by adjustment of arm M to any of the contact groups of switch MS. Operation of the apparatus may be arrested at any time by breaking the circuit at switch 71.

If it is desired to start operation of the apparatus at any predetermined hour of the day and to stop it at a later predetermined hour, the switch 71 is adjusted to select either time-interval control TC or H, as may be desired. The switch 102 is also adjusted to close the circuit between the wires $G^6$ and 103 and the switch 100 is adjusted to connect wires 95 and 101. Arm 82 is then adjusted to bring contact 85 into engagement with any pre-selected clock-face-positioned contact 81 and arm 82a is similarly adjusted to bring its contact 85a into engagement with any pre-selected clock-face-positioned contact 81ª. By adjusting switch 85 to close the circuit between wires 84 and G⁵, a circuit will then be established to include the transformer T, wires 14 and O¹², contacts O¹¹ and O⁷, wires O¹⁰ and 84, switch 85, wire G⁵ and contact G².

Under these conditions, assuming that the clock-operated contact G' is in the full-line or a. m. position of Figures 9 and 13, when the contact arm 44 of control TC reaches the contact 50 occupying the same clock-face-position as the pre-selected contact 81, the contact G² will close a circuit which includes contacts G' and G³, wire G⁶, switch 102, wire 103, through switch B to wire X, contacts 50, 54, wire 57, contacts 46 and 42, wire 22ᶜ, relay R³, wire 21ᶜ, contacts E²⁵ and E⁶, wire E¹⁰, contact E⁴, wires 127 and 14ᵇ to transformer. Thus, the circuit to motor F' is closed through relay R³ and cam member D is operated to open valve D² and the timing operations through controls TC, H and M will not be affected. When the arm 44 moves to the position of the contact 51 of control TC, which corresponds to the clock-face-position of the selected contact 81ª of switch B', a circuit will be established from the plate G' which will include contacts G³, wire G⁶, wire 95, switch 100, wire 101, through switch B' to wire X', contacts 51 and 55, wire 58, contacts 45 and 41, wire 22ᵇ, relay R², wire 21ᵇ, to contact E⁶ and from contact E⁶ to wire 21ᵇ, to the transformer as already described. This will energize motor F' from relay R³ to rotate cam member D to valve-closed position.

If it is desired to start the apparatus manually at any time, and to stop it automatically during the morning period, the switch bar 82 is adjusted to engage the contact 81 corresponding to the hour at which it is desired to stop, and switch 102 is adjusted to connect wires G⁶ and 103. Switch 100 is also adjusted to neutral position. The switch 85 is then adjusted to place wires 84 and 89 in circuit, and the circuit to motor F' is manually closed by adjusting switch 73 to connect wires 89 and 22ᶜ. This will open the valve D² after which the switch 73 is brought to neutral position. With these adjustments, when the arm 44 reaches the clock-face position corresponding to the clock-face position of the switch arm 82, and the contact G' of the clock switch engages the contact G³, a relay circuit will be established including transformer T, wires 14 and O¹², contacts O¹¹ and O⁷, wires O¹⁰ and 84, switch 85, wire G⁵, contacts G' and G³, wire G⁶, switch 102, wire 103, switch B to wire X, contacts 50 and 54, wire 57, contacts 46 and 42, relay R³, wire 21ᶜ, contacts E⁶ and E⁴, wire 127, and wire 14ᵇ to the transformer (see Figure 13). This will energize motor F' sufficiently to rotate the cam D so as to effect closing of the valve D² and also to break the circuits to the relays R and R'. If the apparatus is to be arrested during the afternoon period, switch 102 is moved to a neutral position and switch 100 is adjusted to connect wires G⁷ and 101, the switch 85 being adjusted to connect wires 84 and G. Also, the arm 82ª of the switch B' will be adjusted to engage the contact 81ª which corresponds to the clock-face position representing the time at which the apparatus is to be stopped. With the parts so adjusted, the circuit from the transformer T to the clock switch is the same as described for the a. m. adjustment. When the clock switch moves to a position to bring the contacts G' and G⁴ into engagement and the arm 44 reaches a clock-face position corresponding to that of the arm 82ª, the circuit from G' will include contact G⁴, wire G⁷, switch 100, wire 101, switch B', wire X', to contacts 51 and 55, wire 58, contacts 45 and 41, wire 22ᵇ to relay R², wire 21ᵇ, contacts E²⁴ and E⁶, wire E¹⁰, contact E⁴, wires 127 and 14ᵇ, to the transformer. By this means the motor F' is energized to rotate the cam D to closed position and the circuits to relays R and R' are broken.

When the valve D² has been seated upon cessation of operation of the system for any reason, the contact E⁵ will come to rest in the full line position of Figure 7. If at this time contact E² is not in the full line position of said Figure 7, relay R⁴ will be automatically energized to close the circuit to motor F, and to effect rotation of said contact E² to the full line position. This relay circuit has already been described.

The advantages of the invention will be readily understood by those skilled in the art to which it belongs. For instance, it will be readily observed that a very simple form of water distribution unit is provided, and means associated therewith for accurately regulating said apparatus in such manner as to insure operation thereof at predetermined and regular intervals of time. Also, that easily operable means is provided for varying the lengths of said operation intervals to suit substantially all practical requirements of normal operating conditions.

Having thus explained the nature of the invention and described an operative manner of constructing and using the same, although without attempting to set forth all of the forms in which it may be made, or all of the forms of its use, what is claimed is:

1. A water distribution apparatus comprising a chamber having a plurality of independent outlets controlled by independently movable valves each of which is normally biased to closed position, a supply chamber, a normally seated main valve controlling the supply of water to said chamber, a rotatively mounted cam member for unseating said main valve, a motor for imparting rotative movements to the cam member, a second rotatively mounted cam member having means for successively unseating the outlet valves, a second motor for actuating said second cam member, adjustable time-control means for automatically connecting said motor with a source of power at variable intermittent pre-selected intervals of time, whereby said cam will successively unseat the outlet valves at intervals of time corresponding to said intermittent periods and means operative while the second motor is idle for automatically and temporarily energizing said second motor, so as to bring said second cam to a predetermined position.

2. In a water distribution apparatus, a chamber provided with a plurality of outlets controlled by independently movable valves each of which is normally biased to closed position, an electric motor, means actuated by said motor for successively opening said valves, a plurality of relay switches normally controlling the motor circuit, the coil of each relay being included in a separate circuit, a selective switch operated by said motor and having contacts complemental to the respective relay circuits, and a time-controlled switch having contacts cooperating with the contacts of the selective switch to selectively close the respective relay circuits at constantly recurring intermittent intervals, and time-interval-control means for connecting said time-controlled switch with the relay circuits and having means for selectively predetermining the frequency of the intermittent energizations of said relays.

3. In a water distribution apparatus, a chamber provided with a plurality of outlets controlled by independently movable valves each of which is normally biased to closed position, an electric motor, means actuated by said motor for successively opening said valves, a plurality of relay switches controlling the motor circuit, the coil of each relay being included in a separate circuit, a selective switch operated by said motor and having contacts controlling the relay circuits, a time-controlled switch having means for automatically energizing the relay circuits at hourly intervals, a second time-controlled switch for automatically energizing the relay circuits at shorter intervals, means for connecting either switch with a source of electrical energy, and a common means for connecting both switches with the relay circuits.

4. In a water distribution apparatus, a chamber provided with a plurality of outlets controlled by independently movable valves each of which is normally biased to closed position, an electric motor, means actuated by said motor for successively opening said valves, a plurality of relay switches controlling the motor circuit, the coil of each relay being included in a separate circuit, a selective switch operated by said motor and controlling the relay circuits, time-controlled means for intermittently closing the relay circuits at predetermined intervals, means for connecting the last mentioned means with the relay circuits, and emergency means for automatically breaking the circuit to said time-controlled means.

5. In a water distribution apparatus, a chamber provided with a plurality of outlets controlled by independently movable outlet valves each of which is normally biased to closed position, a main valve controlling the supply of water to said chamber and normally biased to closed position, means for unseating said valve, an electric motor, means actuated by said motor for successively opening said valves, a plurality of relay switches controlling the motor circuit, the coil of each relay being included in a separate circuit, a selective switch operated by said motor and controlling the relay circuits, time-controlled means for intermittently closing the relay circuits at predetermined intervals, means for connecting the last mentioned means with the relay circuits, emergency means for automatically breaking the circuit to said time-controlled means, and means operating in timed relation with said main-valve-opening means to temporarily energize said motor independently of said relay circuits, so as to place said selective switch in a predetermined position when said motor has become disabled.

6. A water distributing apparatus comprising a chamber having a plurality of independent outlets controlled by independently movable outlet valves normally biased to seated position, an electric motor, a plurality of relay switches controlling said motor and included in separate circuits, means operated by said motor for successively unseating said valves, a main supply valve controlling flow of water to said chamber, said valve being normally biased to seated position, a second electric motor for operating said main valve, additional relay switches controlling said second motor and also included in separate circuits, time control means operable to automatically energize the relays of the first motor at successive predetermined positions, so as to successively unseat the outlet valves at corresponding predetermined intervals, and means connected with the time control means for automatically and selectively energizing the relay circuits of the second motor, so as to open and close the main valve and to simultaneously open and close the circuits to the relays controlling the first motor at predetermined times during the operation of said time control means.

RICHARD REYNOLDS.